US006622251B1

United States Patent
Lindskog et al.

(10) Patent No.: US 6,622,251 B1
(45) Date of Patent: Sep. 16, 2003

(54) METHOD TO PUT A MOBILE TERMINAL INTO SLEEP WHEN A FRAME CONTROL CHANNEL CONTAINING A LOCATION OF SLOW BROADCAST CHANNEL DOES NOT INCLUDE WAKEUP INFORMATION

(75) Inventors: Jan Lindskog, Pixbo (SE); Göran Malmgren, Hägersten (SE); Lorens Almehag, Enskede (SE); Fabian Wenger, Göteborg (SE); Johan Ebenhard, Hönö (SE); Ulf Hansson, Lerum (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/528,101

(22) Filed: Mar. 17, 2000

Related U.S. Application Data

(63) Continuation-in-part of application No. 09/287,110, filed on Apr. 7, 1999, now abandoned.

(51) Int. Cl.[7] .............................. G06E 1/26; G06E 1/32; H04Q 7/00
(52) U.S. Cl. ........................ 713/300; 713/320; 370/328
(58) Field of Search ................................ 713/300, 320; 370/311, 328

(56) References Cited

U.S. PATENT DOCUMENTS 5,404,355 A * 4/1995 Raith ......................... 370/311
5,465,392 A * 11/1995 Baptist et al. ............... 370/310
6,058,289 A * 5/2000 Gardner et al. ............. 340/7.32
6,192,230 B1 * 2/2001 van Bokhorst et al. ...... 455/343

FOREIGN PATENT DOCUMENTS

EP          0 615 364 A1      9/1994
JP          11313370 A   *   11/1999   ............ H04Q/7/38

OTHER PUBLICATIONS

Chen et al, A Comparison of MAC Protocols for Wireless Local Networks Based on Battery Power Consumption, 1998 IEEE, pp. 150–157.*

Hagen Woesner, Jean–Pierre Ebert, Morten Schläger, and Adam Wolisz, "Power–Saving Mechanisms in Emerging Standards for Wireless LANs: The MAC Level Perspective", Jun. 1998, pp. 40–48.

* cited by examiner

Primary Examiner—Thomas Lee
Assistant Examiner—Suresh K Suryawanshi

(57) ABSTRACT

In a WLAN where an AP and MTs use a duplex airlink having a MAC frame structure to communicate with each other, the AP places wakeup PDUs at different locations in a MAC frame to allow the MTs to conserve energy by maximizing sleep time. In other embodiments, the wakeup PDUs are sequenced by MAC-ID so that a MT can conclusively determine whether remaining wakeup PDUs in a sequence can contain its MAC-ID, and go to sleep early if they cannot. In another embodiment, a wakeup PDU type can indicate to a corresponding MT whether the MT can expect downlink data later in the same MAC frame. In addition, the wakeup PDU type can indicate to the MT that the MAC frame that it should awaken and remain awake to receive downlink data in the future.

22 Claims, 13 Drawing Sheets

DLCH/ULCH, ULCH/RACH BORDER MAY BE CHANGED
DUE TO TRAFFIC REQUIREMENTS

FIG. 3

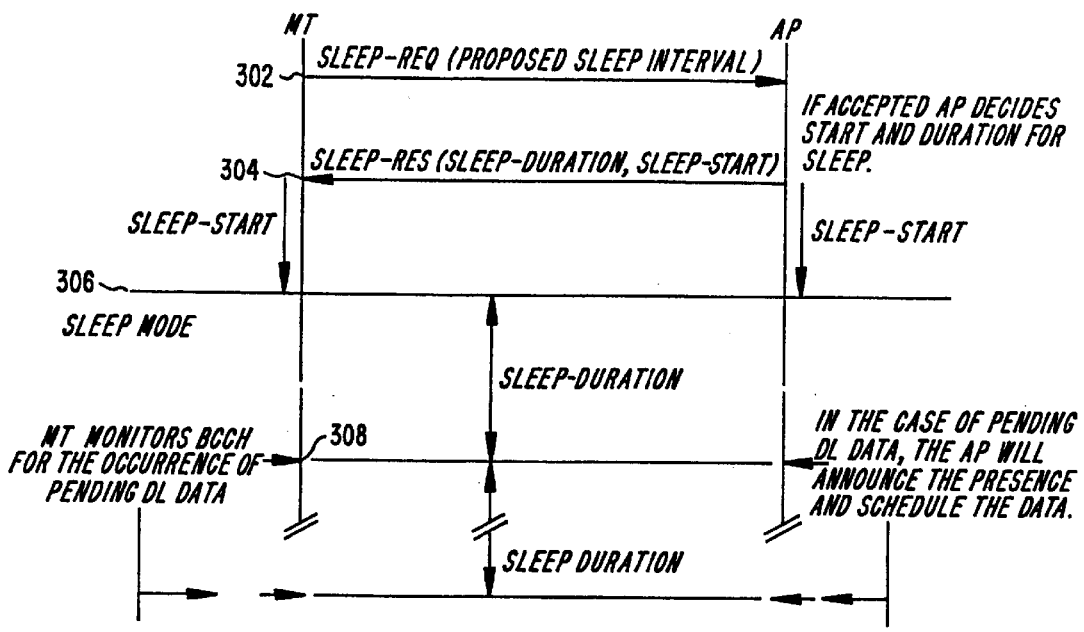

FIG. 4

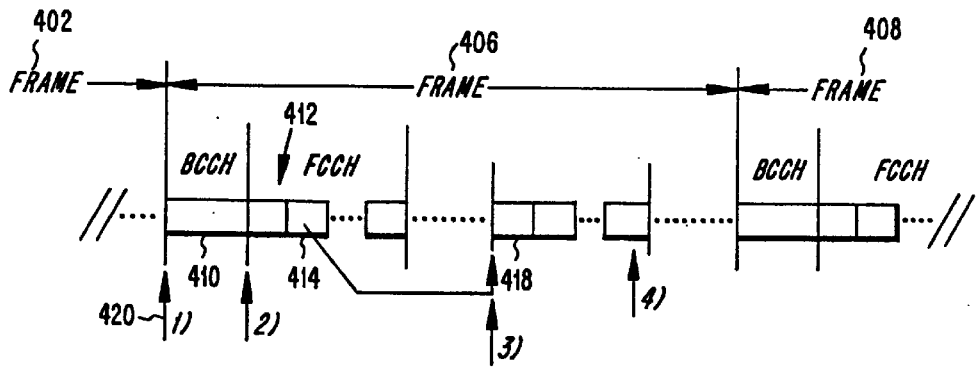

1) MT SLEEP TIME EXPIRES AND MT EXAMINES BCCH FOR THE OCCURRENCE OF PENDING DATA INDICATOR

2) MT ANALYSIS FCCH FOR A PREDEFINED PDU ANNOUNCING THE LOCATION OF THE SBCH IN THE FRAME. (CURRENTLY DEFINED AS MAC-ID=0; DLCC-ID=0)

3) THE MT ANALYSIS THE SBCH PDU's IF THE ID OF THE MT IS INCLUDED IN A WAKE-UP ANNOUNCEMENT PDU.

4a) IF THE MT HAS PENDING DL DATA IN THE AP, I.E. A PDU WITH ITS ID EXISTS, THE MT WILL STAY ACTIVE IN ORDER TO RECEIVE DATA.

4b) IF NO PENDING DATA EXISTS, I.E. THE ID OF THE MT NOT INCLUDED, THE MT WILL ENTER SLEEP MODE AUTOMATICALLY WITHOUT ANNOUNCING THE AP.

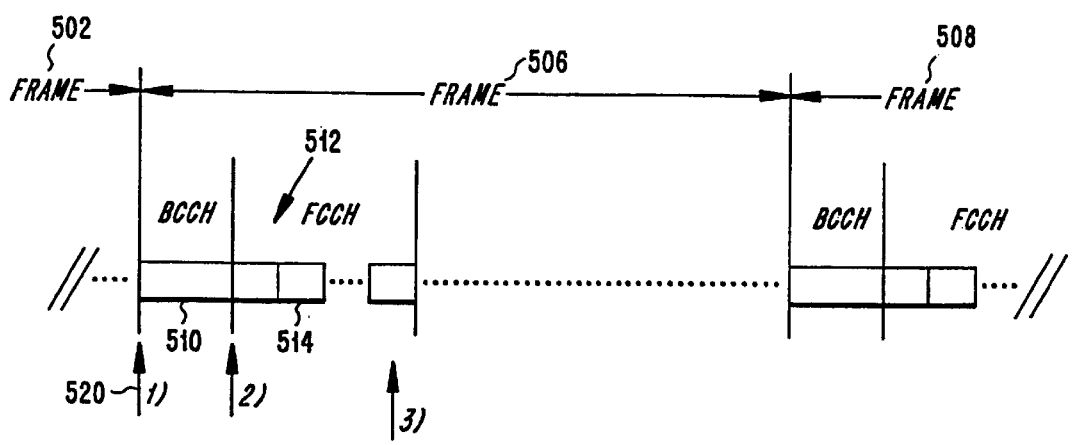

FIG. 5

1) MT SLEEP TIME EXPIRES AND MT EXAMINES BCCH FOR THE OCCURRENCE OF PENDING DATA INDICATOR.

2) MT ANALYSIS FCCH IF THE ID OF THE MT IS INCLUDED IN A WAKE-UP ANNOUNCEMENT PDU.

3a) IF THE MT HAS PENDING DL DATA IN THE AP, I.E. A PDU WITH ITS ID EXISTS, THE MT WILL STAY ACTIVE IN ORDER TO RECEIVE DATA.

3b) IF NO PENDING DATA EXISTS, I.E. THE ID OF THE MT NOT INCLUDED, THE MT WILL ENTER SLEEP MODE AUTOMATICALLY WITHOUT ANNOUNCING THE AP.

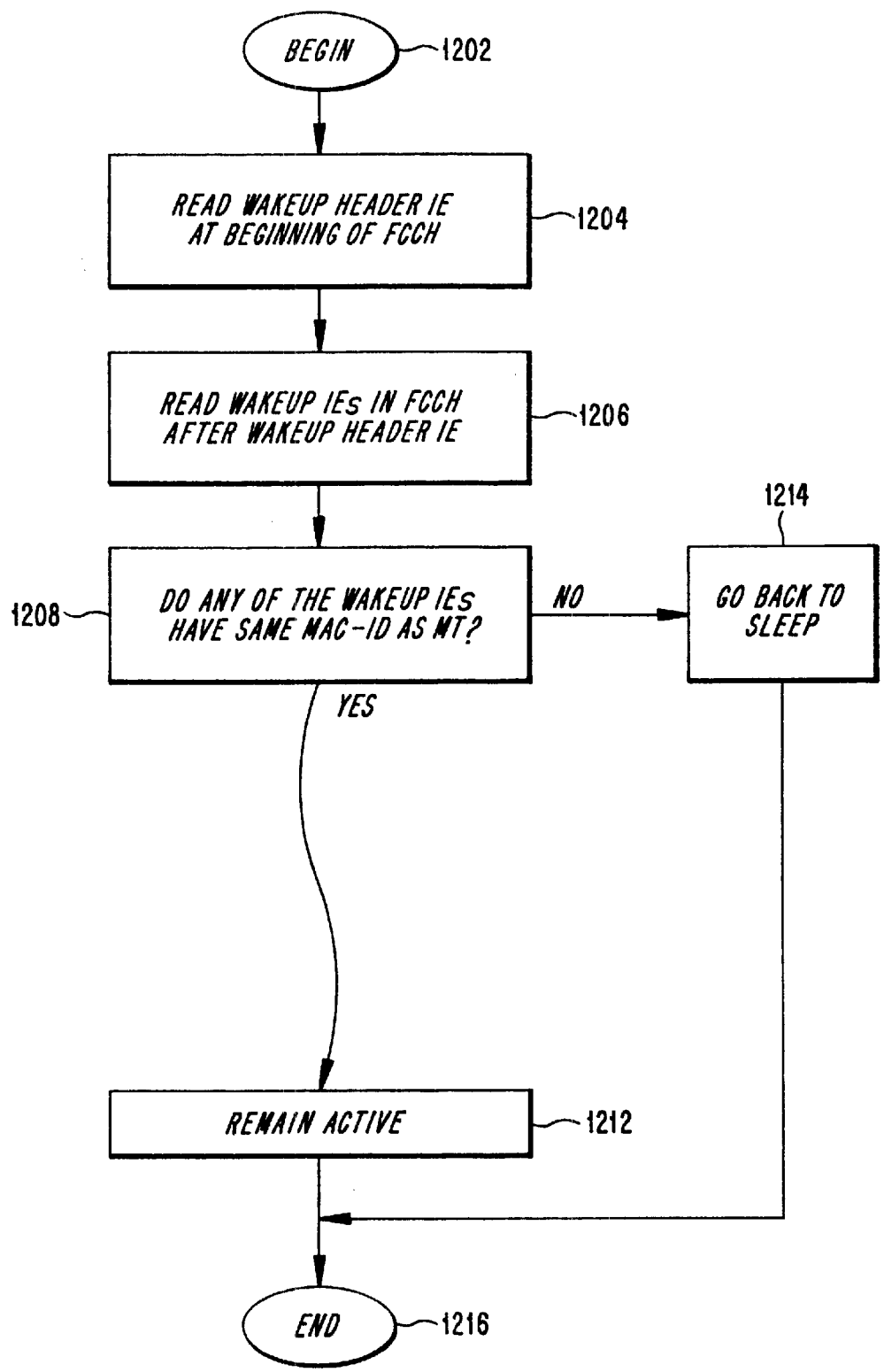

METHOD TO PUT A MOBILE TERMINAL INTO SLEEP WHEN A FRAME CONTROL CHANNEL CONTAINING A LOCATION OF SLOW BROADCAST CHANNEL DOES NOT INCLUDE WAKEUP INFORMATION

This application is a continuation-in-part application of U.S. application Ser. No. 09/287,110 (now abandoned), which was filed in the U.S. Patent and Trademark Office on Apr. 7, 1999, and which is incorporated by reference herein in its entirety.

FIELD OF THE INVENTION

The present invention relates generally to the field of wireless Local Area Network (LAN) communications, and in particular to establishment and coordination of mobile terminal sleep phases within the LAN.

BACKGROUND OF THE INVENTION

A new forthcoming standard for wireless LAN services having high throughput, ETSI HIPERLAN Type 2, promises to open new opportunities for both existing applications and new applications. Current versions and approved portions of the proposed ETSI HIPERLAN Type 2 standard are hereby incorporated by reference. HIPERLAN Type 2 LAN networks use a Time Division Duplex (TDD) airlink, meaning that an Access Point (AP) and a Mobile Terminal (MT) in the LAN network both use the same radio frequency to communicate with each other. The AP is connected to a Network (NW) such as an operator's intranet, and the MT will in most cases be a wireless Network Interface Card (NIC) to a personal computer (PC).

FIG. 1 shows an example configuration for an exemplary HIPERLAN Type 2 system, including an AP 104 within a cell 102. MTs 106, 108 and 110 are also located within the cell 102. As shown in FIG. 1, the AP 104 can communicate via a wireless TDD airlink 112 with, for example, the MT 110. Within each cell, an AP for that cell selects the best frequency with which to communicate with one or more MTs within the cell. The AP's frequency selection can be based on, for example, the AP's measurements of interference at other frequencies, as well on measurements made by MTs within the cell.

In accordance with the proposed HIPERLAN Type 2 wireless LAN standard, a wireless LAN system includes a Medium Access Control (MAC) layer, which is implemented as a reservation-based MAC layer. FIG. 2 shows an exemplary MAC data frame 200 having an exemplary MAC frame structure, including a Broadcast Control Channel (BCCH) 202, a Frame Control Channel (FCCH) 204, a Downlink Channel (DLCHAN) 206, an Uplink Channel (ULCHAN) 208, and a Random Access Channel (RACH) 210. As shown in FIG. 2, the boundary between the DLCHAN 206 and the ULCHAN 208, as well as the boundary between the ULCHAN 208 and the RACH 210, can be changed in accordance with traffic requirements. Assuming that the MT 110 has been authenticated and a connection has been established between the MT 110 and the AP 104, then in order to send Uplink (UL) data via the AP 104, the MT 110 monitors the BCCH 202 and the FCCH 204 for the occurrence of random access opportunities. The MT 110 can then request uplink resources via the RACH 210, and the AP 104 will acknowledge the request for uplink resources and start scheduling UL resources in the TDD airlink 112 for use by the MT 110. In other words, when the MT 110 places a request for uplink resources, a reservation-based access starts.

When the AP 104 receives Downlink (DL) data from the network (NW) for the MT 110, the AP 104 either buffers the data and defers transmission of the data to the MT 110 if the MT 110 is sleeping, or transmits the DL data to the MT 110 at the next possible occasion. The AP 104 announces that it has data for the MT 110 (and/or other MT's within the cell 102) by broadcasting a frame having the format of the frame 200, with a MAC-ID and a Data Link Control Channel ID (DLCC-ID) of the MT 110 in the FCCH 204 following the BCCH 202. In this situation, the FCCH 204 also contains the exact location of the data for the MT 110, in the DLCHAN 206 of the frame 200. An MT having a MAC-ID can have several DLCC-IDs.

Since MTs are often powered by finite sources such as batteries, the HIPERLAN Type 2 standard provides for a sleep mode for the MTs to conserve energy usage by the MTs. This sleep mode is outlined in FIG. 3. As shown in FIG. 3, at a first step 302, an MT sends a sleep request signal, which can include a suggestion by the MT as to how long the sleep interval should be, or in other words, the sleep duration, to an AP. The AP accepts the sleep request signal, decides the starting time and the sleep duration, and then in step 304 sends a sleep reservation signal to the MT indicating the starting time at which the MT should enter the sleep mode, and the sleep duration or time the MT should remain asleep before "waking" to monitor the BCCH of a MAC frame from AP for the occurrence of DL data pending for the MT. The sleep duration can be, for example, an arbitrary number of MAC frames. At step 306 the MT enters the sleep mode, and then when the sleep duration expires at step 308, the MT awakens and monitors the BCCH for indications of DL data pending for the MT. If DL data is pending, the AP will notify the MT via the BCCH and schedule downloading of the DL data to the MT. An alternative is to poll the MT prior to scheduling data to avoid using unnecessary airlink resources, or, for robustness of the sleep concept, the AP can poll the MT prior to sending data to make sure that the MT has changed its sleep state and is prepared to receive data.

In particular, if the MT discerns that the BCCH contains a signal such as a pending data indicator, indicating that downlink data is pending at the AP for an as-yet undetermined MT, then the MT will analyze the content of a Slow Broadcast Channel (SBCH) in the MAC frame for a dedicated wakeup Protocol Data Unit (PDU) directed to the MT. The SBCH location in the MAC frame is given by an Information Element (IE) in the FCCH. In other words, the MT will check further to determine whether it is the MT (or one of the MTs) for which data is pending. If no downlink data is pending for any MT, then the MT returns to the sleep mode for another sleep duration time period, at the end of which it will awaken and repeat the cycle by monitoring the BCCH for a pending data indicator, etc. If no pending data indicator is present, or if the indicator indicates that no downlink data is pending, then the MT will go back to sleep.

FIG. 4 shows the case where an MT analyzes the SBCH in the MAC frame for a dedicated wakeup PDU. As shown in FIG. 4, when an MT sleep time expires at time 420, the MT first examines the BCCH 410 to determine whether the BCCH 410 contains a pending data indicator indicating that the MAC frame 406 contains data for an MT. The pending data indicator does not indicate which MT that the data, if present, is intended for. If a pending data indicator in the BCCH 410 does indicate that the MAC frame 406 contains data for an as yet unspecified MT, then the MT seeks to determine whether the MAC frame 406 contains data for it. It does so by analyzing the FCCH 412 for an indication as to where the SBCH 418 begins in the MAC frame. For example, the FCCH 412 can contain a predefined Information Element (IE) 414 that indicates where the SBCH 418 begins. For example, the predefined IE 414 can be defined to include a MAC-Identification (MAC-ID)=0 and a Downlink Control Channel Identification (DLCC-ID)=0.

The SBCH is located in the DLCHAN of the MAC frame 406. A DLCHAN can contain, or host, several logical channels, including the SBCH. These channels can include, for example, a User Data Channel (UDC), a DLC Control Channel (DLCH), where DLC stands for "Data Link Control", a Dedicated Control Channel (DCCH), an In-Band Channel (IBCH), and the Slow Broadcast Channel (SBCH) mentioned above.

The MT then analyzes the SBCH 418 to determine if the SBCH 418 contains any wake-up PDUs that include the MT's MAC-ID. If yes, then the MT knows that downlink data is pending for it, and the MT will stay active to receive the downlink data. If no, then the MT knows that no downlink data is pending for it, and it returns to the sleep mode automatically without announcement to the AP.

In a case where the MT has pending uplink data for transfer to the AP, then the MT can cut short its sleep duration timer or time period and request uplink resources from the AP by, for example, sending an uplink resource request signal on the RACH 210 of a MAC frame 200.

However, these methods suffer several drawbacks. First, during an interval between a first time when the MT analyzes the BCCH for the occurrence of a predefined PDU indicating a location of an SBCH in the MAC frame, and a second time when the MT waits for the SBCH to occur within the MAC frame to determine whether it contains a wake-up PDU including the MAC-ID of the MT, or a second time when the SBCH starts within the MAC frame, the MT has no interest in the MAC frame. Although the SBCH can be located right after the FCCH, which would minimize this time, the SBCH can also be located elsewhere in the MAC frame. Furthermore, there are typically different sleep levels, or levels of low power consumption, that the MT can achieve. In the lowest, both analog and digital portions of the MT are in a minimal power consumption mode. However, as those of ordinary skill in the art will recognize, when it is time to awaken the MT from such a deep sleep, the MT can require a comparatively significant amount of time to come awake. This is because, for example, a Voltage Controlled Oscillator (VCO) and a Phase Locked Loop (PLL) in the analog portions of the MT require time to synchronize. Thus, ideally the MT should revert to deep slumber for the interval between the first and second times, but if the interval is shorter than an amount of time necessary to put the MT into deep sleep and then reawaken it, then the MT cannot be placed into deep sleep during the interval. Thus, if the SBCH is not located immediately after the FCCH, then power requirements for the MT over the time of the MAC frame increase.

Furthermore, if the AP requests the MT to send an acknowledgment within the same MAC frame that it is awake after receiving and identifying a wake-up PDU in the SBCH, then in order to provide the MT with as much time as possible to respond to the wake-up PDU and prepare and send the acknowledgment, the SBCH should be located right after the FCCH. However, as indicated above, the SBCH can be located arbitrarily in the DLCHAN within the MAC frame.

In addition, in a situation where the AP organizes MTs within its cell into different sleep groups, each group waking up at a different time, then if a sleep group contains only one MT, then a necessary preamble in the SBCH is comparatively large and represents extra overhead as compared with sleep groups containing more MTs.

With respect to the sleep groups, for inactive MTs, or in other words MTs that are in a sleep mode without any data transmitted in uplink or downlink, the power consumption for the Wireless Local Area Network (WLAN) device at the MT includes power consumption during the time the MT monitors the BCCH, FCCH and SBCH of a MAC frame at the end of a sleep interval or duration, in order to detect the occurrence of downlink data pending for the MT, in addition to power consumption during the inactive periods. Since the AP decides when the sleep mode of an MT will start, the AP can allocate the MTs within its cell into different sleep groups. The groups can have the same or different tine durations, but awaken at different times so that they are not "in phase." This can reduce power consumption at the MTs. For example, where downlink data is pending for only one MT in a group, if the group is small then fewer MTs must awaken to monitor the BCCH, FCCH and SBCH to determine whether the pending downlink data is for them, than if the group is large. Of course, smaller and therefore more numerous sleep groups require additional overhead and resources at the AP, so this is a tradeoff.

FIG. 6 illustrates the principle of organizing MTs into different sleep groups having different phases. As shown in FIG. 6, at time 610 a first MT (MT-A) sends a sleep request signal to the AP, including a proposed sleep interval or duration. At step 612, the AP sends a sleep reservation signal to the first MT, including a sleep duration and sleep start time that the AP has chosen for the first MT. The sleep start time can be in the form of an offset, for example a number of MAC frames after the current MAC frame, which the first MT should wait before entering the sleep mode. In step 614, a second MT (MT-B) sends a sleep request signal to the AP, including a proposed sleep interval or duration. At step 616, the AP sends a sleep reservation signal to the second MT, including a sleep duration and sleep start time that the AP has chosen for the second MT. The first MT then enters sleep in step 618 at the time specified by the AP, and then subsequently the second MT enters sleep in step 620 at the other time specified by the AP. The AP can select the sleep start times, for example, to add an MT to an already existing sleep group of MTs. At the step 622, the sleep duration of the first MT expires, and the first MT awakens to monitor the BCCH for an indication of pending downlink data and determine whether any pending downlink data is intended for it. If no downlink data is pending for the first MT, then it resumes sleep and restarts the sleep duration time at step 622, and then awakens upon expiration of the sleep duration at step 626 to start the cycle anew. At the step 624, at a time between the steps 622 and 626, the sleep duration for the second MT expires, and the second MT awakens to monitor the BCCH in the same manner as the described for the first MT, and proceeds in a similar fashion.

Although this method has some advantages, it also has specific features that can be disadvantages. For example, the resources necessary for the AP to optimally spread MTs among different sleep groups may require context information for each MT, buffer storage for each MT, and an awareness of when each MT's sleep duration expires. For example, an expiration timer may need to be aware of each MT's sleep phase ID or sleep group ID.

Accordingly, it is possible that the AP will divide its fleet of MTs into a smaller set of sleep groups or phases. Furthermore, most of the time when an MT belonging to a phase with other MTs wakes up in order to monitor the MAC frame for pending downlink data, the MT will discover that the downlink data is not intended for it but instead intended for another MT in the sleep phase or sleep group.

Since the SBCH does not have any predefined structure, the MT must analyze or monitor every PDU included in the SBCH. Furthermore, decoding failures that occur when an MT monitors the BCCH, FCCH and SBCH can cause problems for a sleeping MT because decoding failures can prevent the MT from becoming aware of downlink data that is pending for it. Depending on MT behavior, the effect can vary. For example, if the MT wakes up for every decode failure just in case downlink data might have been pending for it, then the MT will often awaken unnecessarily and thus consume extra power. It the MT ignores probable decode failures, then it may react slowly to receive downlink data pending for it. For example, it will sleep for an entire sleep duration before again checking for pending downlink data.

In Mobitex and pACT (Personal Air Communications System) systems, mobiles must know the concept of different sleep phases, which is not the case for HIPERLAN Type 2.

SUMMARY OF THE INVENTION

In accordance with an exemplary embodiment of the invention, problems such as those identified above are solved by using the FCCH channel in the MAC frame to convey wake-up announcements to one or more MTs. In accordance with a second exemplary embodiment of the invention, a wake-up announcement can instruct an MT to send a predetermined reply signal on an allocated uplink channel or on the RACH within the same MAC frame, so that the wake-up announcement functions as a polling request from the AP to the MT.

In accordance with another exemplary embodiment of the invention, a wake-up announcement for an MT can indicate that downlink data intended for the MT is contained later in the same MAC frame.

In accordance with another embodiment of the invention, a wake-up announcement for an MT can contain a null indicator, which indicates that the MAC frame does not contain downlink data for the MT and that the MT should not send a reply signal to the AP, but instead should remain awake to await downlink data that will be provided in the future.

In accordance with another exemplary embodiment of the invention, resources necessary to coordinate sleep groups having different time phases, for example AP resources necessary to handle phase IDs of different MTs, are conserved by using some or all of each MT's MAC-ID. In accordance with an exemplary embodiment of the invention, power is further conserved by locating the information element (IE) in the FCCH that indicates where in the DLCHAN the SBCH starts, at the beginning of the FCCH so that an MT can go back to sleep during the remainder of the FCCH, to re-awaken when the SBCH starts. In accordance with an exemplary embodiment of the invention where wake-up PDUs such as wakeup IEs are located in the FCCH, the wake-up IEs are located at the beginning of the FCCH.

Where the MAC frame also includes an SBCH, the IE in the FCCH indicating where the SBCH is located in the DLCHAN can be located at the very beginning of the FCCH with the wake-up PDUs right after, so that after monitoring or analyzing the wake-up PDUs an MT will know if downlink data is pending for it, and when the SBCH will occur (in other words, where in the DLCHAN the SBCH is located).

In accordance with a another exemplary embodiment of the invention, the wake-up PDUs (in either the FCCH or the SBCH) are ordered in ascending or descending order by MAC-ID, so that an MT that is analyzing the PDUs can easily determine when remaining PDUs that it has not yet analyzed cannot contain its MAC-ID, and conserve power by cutting short its analysis and going to sleep early.

In accordance with another exemplary embodiment of the invention, the ordering of the PDU's can alternate between ascending and descending, for example to ensure that different MTs are treated more equally.

In accordance with another exemplary embodiment of the invention, the AP can place non-wakeup PDUs before the wake-up PDUs (in either the FCCH or the SBCH) to ensure that the MTs analyze the non-wakeup PDUs. Alternatively, where the wakeup PDUs are located in the FCCH, an SBCH-IE (an IE indicating the location of the SBCH in the DLCHAN) can be located in the FCCH before the wakeup PDUs, so that all MTs, not just the ones for which there is a wakeup PDU, will monitor the contents of the SBCH.

In accordance with another exemplary embodiment of the invention, the wakeup PDUs (in the FCCH or the SBCH) can be ordered by MAC-ID, for example in ascending or descending order, so that when an MT encounters a decode failure but recovers during the sequence of wakeup PDUs, the MT can discern whether the portion of the sequence that it missed could have contained a wakeup PDU having its MAC-ID, and then act appropriately.

In accordance with another exemplary embodiment of the invention, where wakeup PDUs are located in the SBCH, an index can be provided in the SBCH prior to the wakeup PDUs. The index indicates where in the list of wakeup PDUs a wakeup PDU bearing an MTs particular MAC-ID might occur. For example, the index can indicate different ranges of MAC-IDs, so that an MT can go to sleep after analyzing the index and then awaken to receive the portion of the SBCH containing a possible range of wakeup PDU MAC-IDs that includes the MT's MAC-ID.

In accordance with another exemplary embodiment of the invention, when an MT wakes up to monitor a MAC frame, if the MT finds an indication that data is pending, for example an indication in the BCCH of the MAC frame, then the MT will also monitor the next MAC frame for an indication that data is pending.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have designated by like reference numerals.

FIG. 3 shows an exemplary sleep negotiation dialog between an MT and an AP in accordance with the HIPERLAN Type 2 standard.

FIG. 4 shows an exemplary MAC frame that can contain wakeup PDUs located in an SBCH of the MAC frame.

FIG. 5 shows an exemplary MAC frame in accordance with an exemplary embodiment of the invention.

FIG. 12 shows a flow chart of a process in accordance with an exemplary embodiment of the invention.

DETAILED DESCRIPTION OF THE INVENTION

Figure 1:
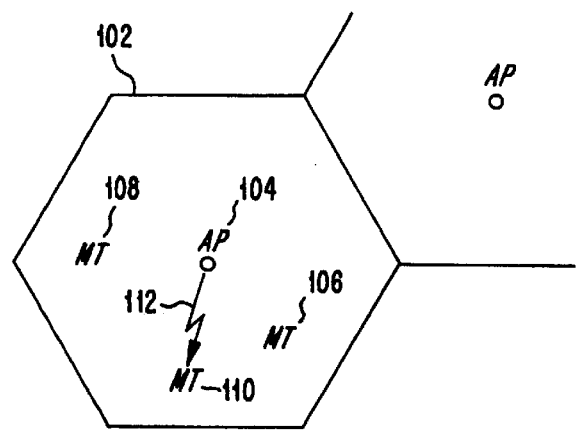
FIG. 1 shows an exemplary cell structure in accordance with the HIPERLAN Type 2 standard.
Figure 2:
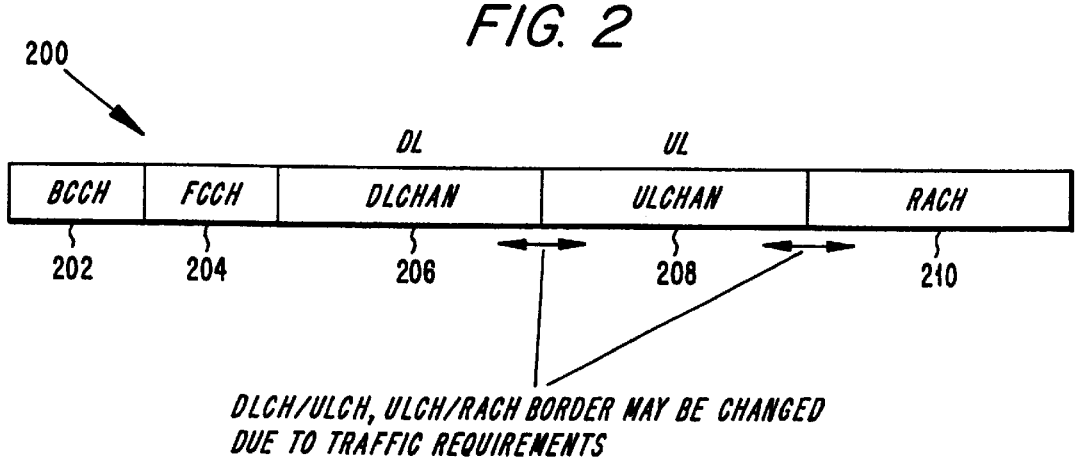
FIG. 2 shows an exemplary MAC frame in accordance with the HIPERLAN Type 2 standard.
Figure 6:
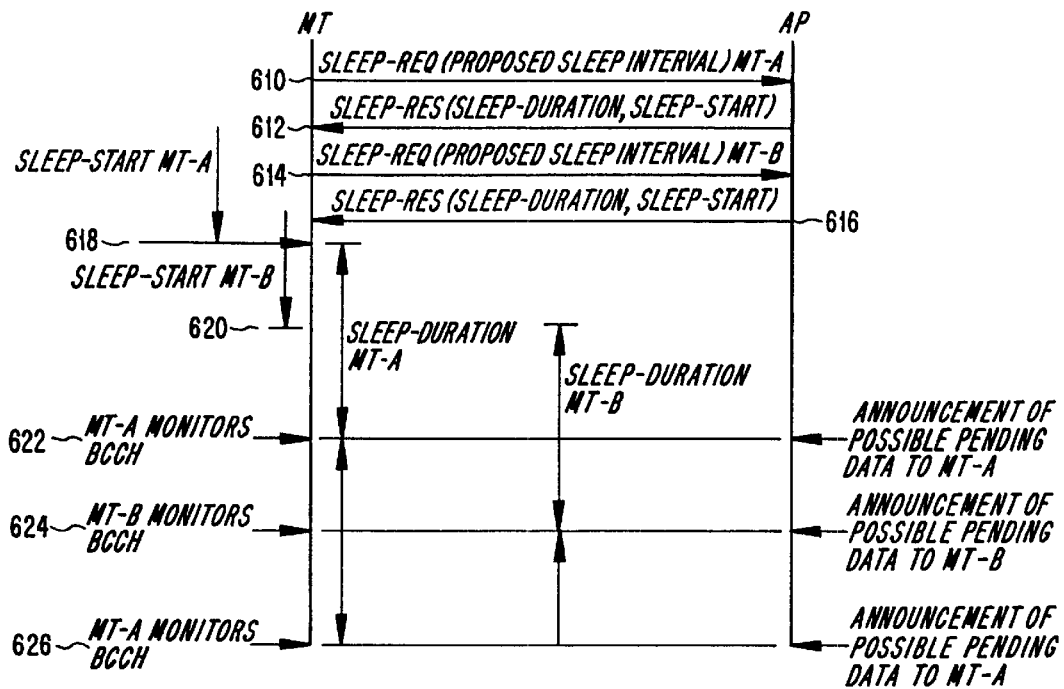
FIG. 6 shows MT sleep groups having different phases, in accordance with the HIPERLAN Type 2 standard.

In accordance with a first embodiment of the invention, wakeup PDUs are located in the FCCH, rather than in the SBCH. In particular, if an MT discerns that the BCCH contains an indication that DL data is pending at the AP for the MT, then the MT will analyze the content of the FCCH in the MAC frame for an Information Element (IE) or wakeup PDU indicating downlink data is scheduled or pending for the MT. The downlink data can be control data for the MT, and/or end-user application data for the MT.

FIG. 5 shows the case where an MT analyzes the content of the FCCH in the MAC frame for an Information Element (IE) having the MAC-ID of the MT, thus indicating that downlink data is pending for the MT. As shown in FIG. 5, when an MT sleep time expires at time 520, the MT first examines the BCCH 510 to determine whether the BCCH 510 contains a pending data indicator such as that described with respect to FIG. 4, indicating that the MAC frame 506 contains data for an MT. If a pending data indicator in the BCCH 510 does indicate that the MAC frame 506 contains data for an as yet unspecified MT, then the MT seeks to determine whether the MAC frame 506 contains data for it. It does so by analyzing the FCCH 512 to determine if the FCCH 512 contains a wake-up announcement PDU, such as the wakeup IE 514, that includes the MAC-ID of the MT. If yes, then the MT knows that there is pending downlink data for it, and it will stay active (or in other words, awake) in order to receive the pending downlink data. If no, then the MT knows that there is no pending downlink data for it, and it will re-enter the sleep mode automatically without announcement to the AP.

Since the FCCH will always be present in the MAC frame when data is scheduled in the frame, there is no extra cost incurred when the AP divides sleeping MTs into different groups. For example, to awaken one sleeping MT, one IE in the FCCH bearing the MAC-ID of the MT is necessary, and if two sleeping MTs are to be awakened, then two IEs are required in the FCCH, and so forth. Thus, overhead such as that associated with a preamble of an SBCH is avoided.

Furthermore, the IE or wakeup PDU for a particular sleeping MT can simply be the same IE that would be used to signal the MT if it were awake, or in other words active, since the IE for an active MT will contain both the MAC-ID for the MT and will indicate which downlink channel in the MAC frame the MT can find the downlink data that is scheduled for it to receive.

The IE or wakeup PDU can also be of a type that indicates to the MT that the MT should send a predetermined acknowledge signal back to the AP in an allocated uplink channel within the MAC frame, where the IE identifies the allocated uplink channel that the AP has set aside for the MT. Thus, the IE can be used as a polling request from the AP to the MT. Alternatively, the IE can instruct the MT to send the predetermined acknowledge signal back to the AP via the RACH in the same MAC frame, or in a subsequent MAC frame when the RACH first becomes available. Since the FCCH is located earlier in the MAC frame than the SBCH, locating the IE in the FCCH instead of the SBCH provides the MT with more time to awaken and prepare and send the predetermined acknowledge signal. The predetermined acknowledge signal can be identical to an acknowledge signal used for active or awake MTs. The predetermined acknowledge signal can also be sent in accordance with a rule set for acknowledgment signaling. The rule set can govern how logical channels to the MT are used, for example by allowing the AP to poll the MT for resource requests and control data.

The IE or wakeup PDU can also include a null pointer, or in other words a pointer in the IE that is set to a null value, where the null value indicates to the MT that the MAC frame does not contain downlink data for the MT, and the MT should simply remain awake until further notice and decode each BCCH and FCCH that comes along, in order to receive downlink data that will be provided to it in the future. For example, this can provide a scheduler in the AP with a graceful way to handle a new MT in the same MAC frame that the MT wakes up in.

Figure 10:
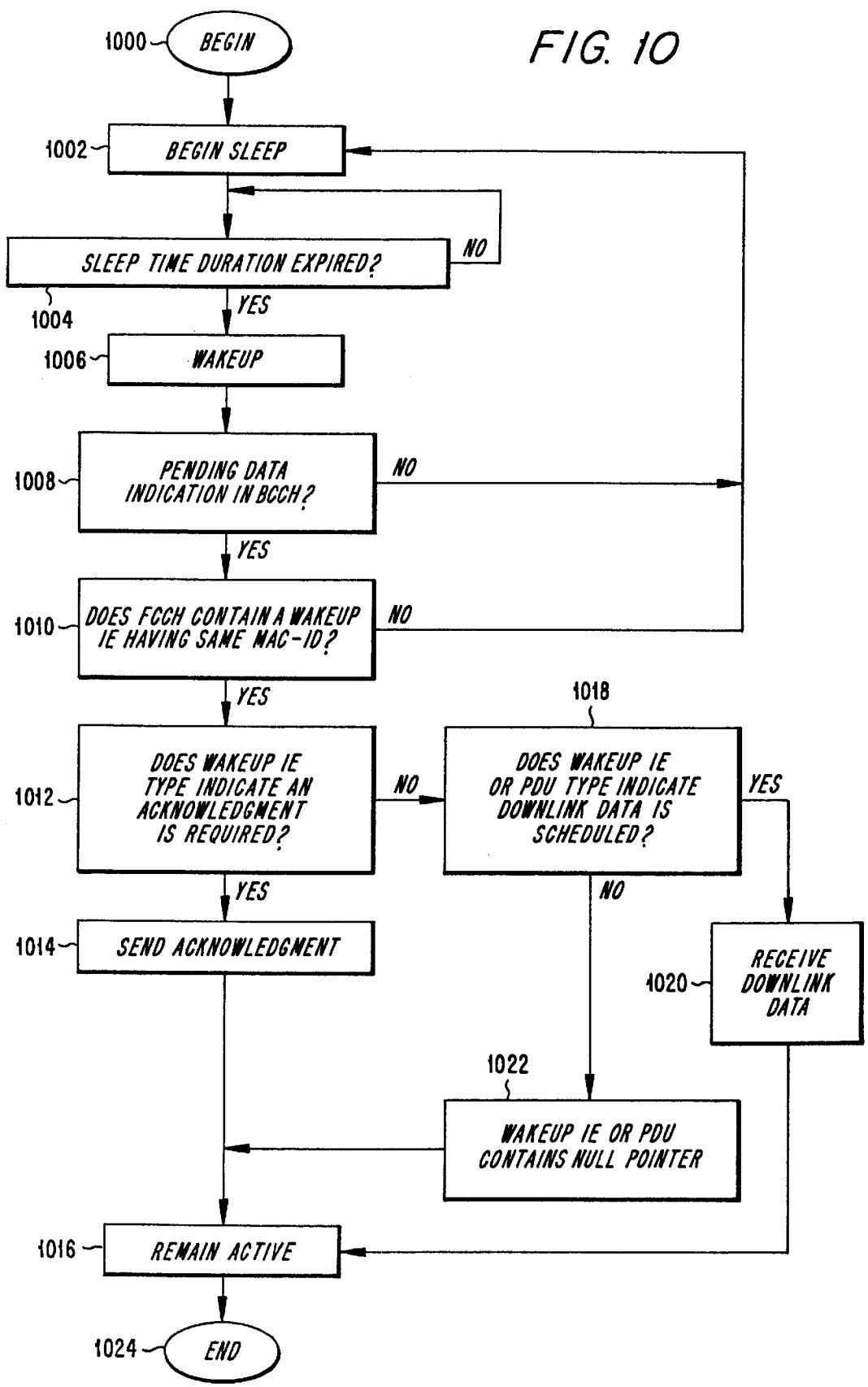
FIG. 10 shows a flow chart of a process in accordance with an exemplary embodiment of the invention.

FIG. 10 generally illustrates the principles described above with respect to the first embodiment. As shown in FIG. 10, which begins with step 1000, an MT begins sleeping at step 1002. At step 1004, the MT checks whether the sleep time duration has expired. If no, then control returns to step 1004. If yes, then control flows to step 1006, where the MT wakes up and then in step 1008 analyzes the BCCH of a MAC frame. If the BCCH does not contain a pending data indication, then control flows back to step 1002 where the MT goes back to sleep without giving notice to the AP. If the BCCH does contain a pending data indication, then control flows from step 1008 to step 1010, where the MT analyzes the FCCH to determine whether the FCCH contains a wakeup IE or PDU having the same MAC-ID as the MT. If no, then control proceeds to step 1002, where the MT returns to sleep. If yes, then control proceeds from step 1010 to step 1012, where the MT analyzes the wakeup IE or PDU to determine whether the MT is required to send an acknowledgment to the AP. If yes, then control flows to step 1014, where the MT sends the acknowledgment. From step 1014, control flows to step 1016 where the MT remains active, or in other words, awake. From step 1016 control flows to step 1024, and the process ends. If in step 1012 the MT determines that an acknowledgment is not required, then control flows from step 1012 to step 1018 where the MT checks the type of the wakeup IE or PDU to determine whether downlink data is scheduled in the MAC frame for the MT. If yes, then control proceeds from step 1020, where the MT receives the downlink data. From step 1020 control proceeds to step 1016. If in step 1018 the MT determines that downlink data is not scheduled, then control proceeds from step 1018 to step 1022, where the MT determines that the wakeup IE or PDU contains a null pointer, and from step 1022 control proceeds to step 1016.

In accordance with a second embodiment of the invention, where an AP divides MTs into different sleep groups and where, for example, each sleep group awakens at a different time, some or all of an MT's MAC-ID can be used to identify to which sleep group the MT belongs. For example, the AP can use the least significant bit of MAC-ID to divide MTs into two groups. Since MTs are automatically assigned to a phase or sleep group based on their MAC-ID, for example when the AP first receives the MAC-ID of an MT, in some situations the numbers of MTs in each group will not be evenly balanced. However, based on a reasonable number of users in each group, and based on the randomness of each user's behavior, the simplicity and efficiency this concept provides to the AP outweigh the drawbacks that can periodically arise when group numbers are temporarily out of balance.

Figure 11:
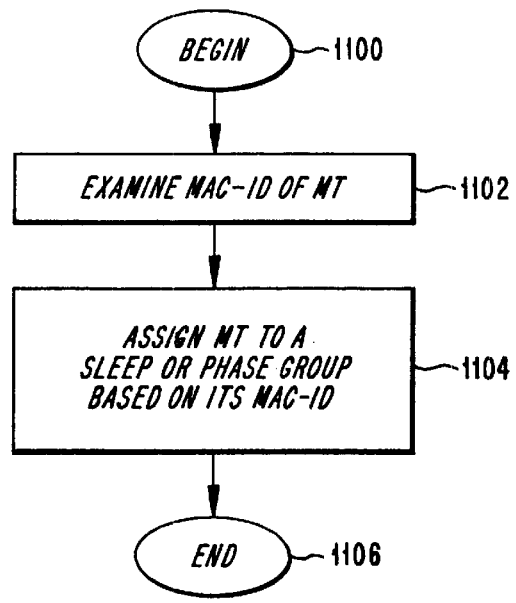
FIG. 11 shows a flow chart of a process in accordance with an exemplary embodiment of the invention.

FIG. 11 generally illustrates the principles described above with respect to the second embodiment. As shown in FIG. 11, the process begins in step 1100, and then in step 1102 the AP examines an MT's MAC-ID. From step 1102 control flows to step 1104, where the AP assigns the MT to a sleep or phase group based on the MT's MAC-ID. From step 1104 control flows to step 1106, where this process ends.

If different MTs have different expected Quality of Service or levels of required performance, then the fleet of MTs can be first divided into classes reflecting the different levels, and then MAC-IDs can be used to divide the MTs into groups within each class.

Figure 7:
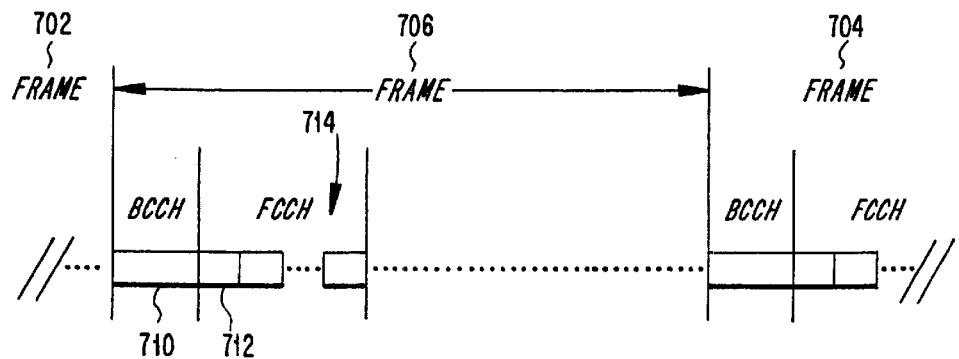
FIG. 7 shows an exemplary MAC frame in accordance with an exemplary embodiment of the invention.

In accordance with a third embodiment of the invention and as shown in FIG. 7, where the wakeup information includes wakeup IEs located in the FCCH 714 in a MAC frame 706 after a BCCH 710, a wakeup header IE 712 is located at the very beginning of the FCCH 714. Wakeup IEs are located in the FCCH 714 right after the wakeup header IE 712. The wakeup header IE 712 indicates where in the MAC frame (for example, where in the DLCHAN of the MAC frame) the SBCH is located. Thus, where an MT's MAC-ID is not included in any of the wakeup IEs or PDUs, the MT need only monitor the BCCH and the FCCH until it has analyzed the last wakeup IE, and then it can go to sleep instead of a) remaining awake, or b) going to sleep and then awakening later, to analyze the contents of the SBCH. The wakeup header IE 712 can also contain information regarding the wakeup IEs grouped after it in the FCCH 714, for example the number of wakeup IEs that follow the wakeup header IE 712. The MT can use this information to help it determine when it can finally cease monitoring the contents of the MAC frame 706.

FIG. 12 generally illustrates the principles described above with respect to the third embodiment. As shown in FIG. 12, the process begins at step 1202, after the MT has determined that the BCCH contains a pending data indication. In step 1204, the MT reads the wakeup header IE located at the beginning of the FCCH. From step 1204 control proceeds to step 1206, where the MT reads the wakeup IEs in the FCCH following the wakeup header IE. From step 1206 control proceeds to step 1208, where the MT determines whether any of the wakeup IEs in the FCCH have the same MAC-ID as the MT. If no, then control proceeds to step 1214 where the MT goes back to sleep, and the control proceeds to step 1216 where the process ends. If yes, then control proceeds from step 1208 to step 1212, where the MT remains active. From step 1212 control proceeds to step 1216.

Figure 8:
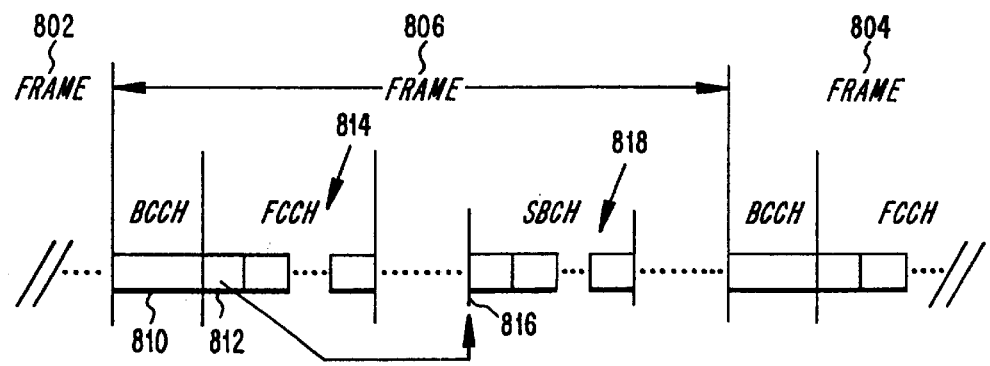
FIG. 8 shows an exemplary MAC frame in accordance with an exemplary embodiment of the invention.

In accordance with a fourth embodiment of the invention and as shown in FIG. 8, an SBCH-IE 812 is located at the beginning of the FCCH 814 in a MAC frame 806 after the BCCH 810. Wakeup PDUs, if present, are located in the SBCH 818. In this embodiment the FCCH 814 does not include wakeup IEs. The SBCH-IE 812 indicates where in the MAC frame 806 the SBCH 818 starts, for example at the location 816. Thus, an MT can go to sleep immediately after analyzing the SBCH-IE 812 and thus avoid consuming extra power during the remainder of the FCCH 814, and then awaken at the SBCH beginning location 816 to monitor the contents of the SBCH to determine whether any wakeup PDUs located in the SBCH 818 are intended for the MT. For example, the MT determines whether any wakeup PDUs present in the SBCH 818 have a MAC-ID that matches the MT's MAC-ID. Wakeup PDUs in the SBCH 818 can also be grouped at or near the beginning of the SBCH 818.

Figure 13:
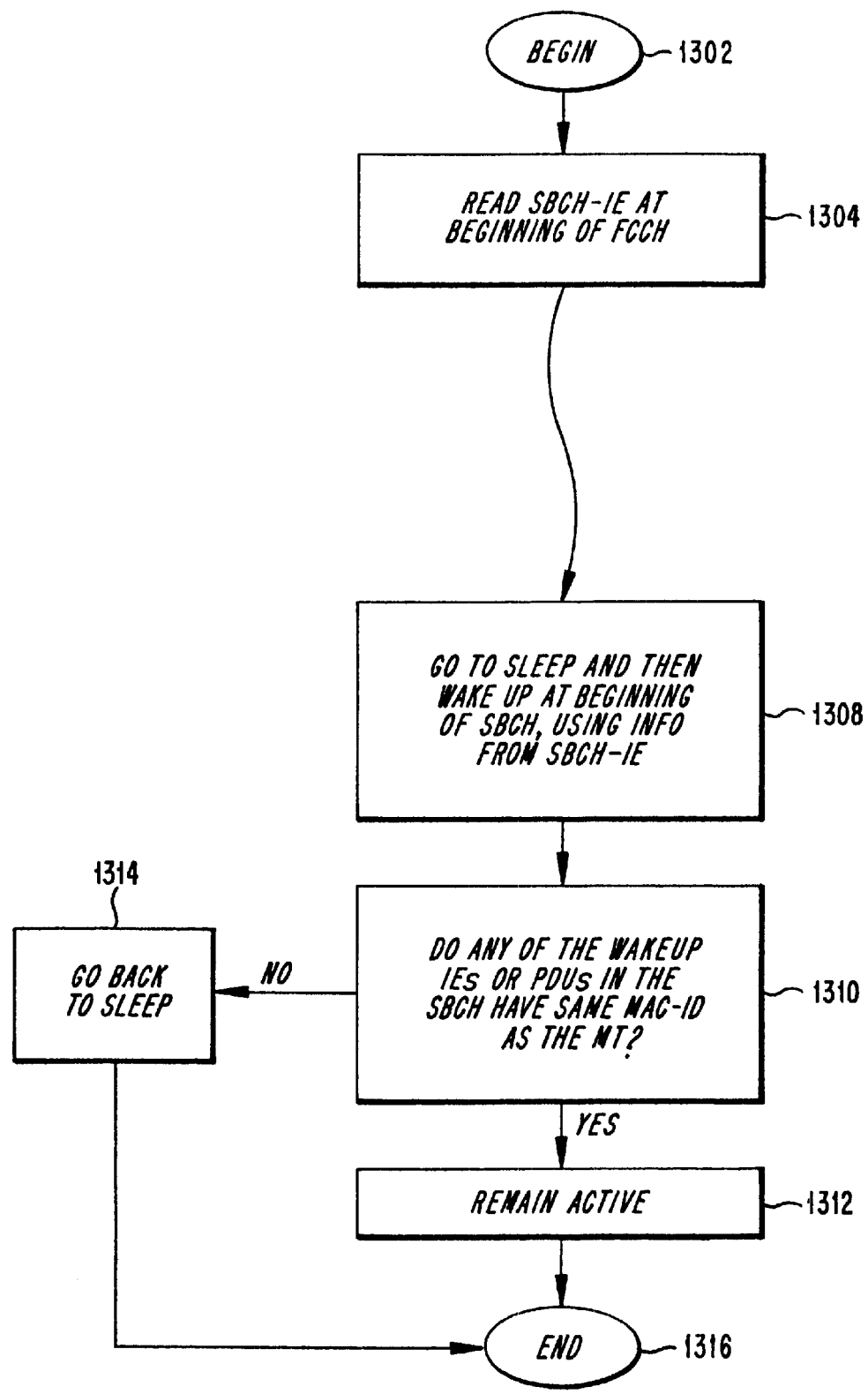
FIG. 13 shows a flow chart of a process in accordance with an exemplary embodiment of the invention.

FIG. 13 generally illustrates the principles described above with respect to the fourth embodiment. As shown in FIG. 13, the process begins at step 1302, after the MT has determined that the BCCH contains a pending data indication. From step 1302 control proceeds to step 1304 where the MT reads the SBCH-IE at the beginning of the FCCH. From step 1304 control proceeds to step 1308, where the MT goes to sleep and then wakes up at the beginning of the SBCH, using information from the SBCH-IE. From step 1308 control flows to step 1310, where the MT reads the SBCH, and determines whether any wakeup PDUs in the SBCH have the same MAC-ID as the MT. If yes, then control flows from step 1310 to step 1312 where the MT remains awake. From step 1312 control flows to step 1316 where the process ends. If in step 1310 the MT determines that no wakeup PDUs in the SBCH have the same MAC-ID as the MT, then control flows from step 1310 to step 1314 where the MT goes back to sleep, and from the step 1314 control flows to step 1316.

In accordance with a fifth embodiment of the invention, the embodiments shown in FIGS. 7 and 8 can be further refined by allowing the AP to place an IE that it determines to be of special interest in the FCCH prior to the SBCH-IE, to ensure that all MTs will examine the special interest IE. For example, in the case where wakeup IEs are located in the FCCH as illustrated in FIG. 7, the SBCH-IE can be located just after the wakeup header IE or any other IE of special interest.

In accordance with a sixth embodiment of the invention, wakeup IEs in the FCCH or wakeup PDUs in the SBCH can be ordered or sequenced by MAC-ID, to allow an MT that is monitoring the sequence to discern whether its MAC-ID is excluded from the remainder of the sequence, and therefore whether the MT can go to sleep without monitoring the remainder of the sequence. For example, where the wakeup IEs or PDUs are organized so that the MAC-IDs are in ascending order and the wakeup IE that an MT is currently monitoring has a MAC-ID that is greater than the MAC-ID of the MT, then the MT can conclude that none of the remaining wakeup IEs will have its MAC-ID and therefore it can go to sleep instead of monitoring them. By comparing the MAC-IDs of the first and second wakeup IEs or PDUs, an MT can discern whether the sequence is ascending or descending. Furthermore, in accordance with another embodiment of the invention, the sequence that an MT encounters can be alternately ascending and descending, to ensure that MTs having different MAC-IDs are treated fairly with respect to each other over time. For example, where an MT having a large value MAC-ID is near the end of the sequence a first time, it will be near the beginning of the sequence the next time.

In accordance with a seventh embodiment of the invention, wakeup IEs or PDUs that are ordered by MAC-ID number can be used to help an MT decide what to do in the event of a decode failure that causes the MT to start monitoring the MAC frame after the sequence of wakeup IEs or PDUs has begun. For example, if the sequence is ascending and the MAC-ID of the MT is less than the MAC-ID of the current wakeup IE or PDU, then the MT knows that it could have missed a wakeup IE or PDU bearing its MAC-ID and intended for it, and can take appropriate action. If the sequence is ascending and the MAC-ID of the MT is greater than the MAC-ID of the current wakeup IE or PDU, then the MT knows that the wakeup IEs or PDUs that it missed did not contain its MAC-ID, and it can continue to monitor the MAC frame as though the decode failure never occurred. Similar principles apply where the sequence is descending. For example, where the sequence is descending and the MAC-ID of the current wakeup IE or PDU is greater than the MAC-ID of the MT, then the MT knows that the wakeup IEs or PDUs that it missed did not contain its MAC-ID.

Figure 14:
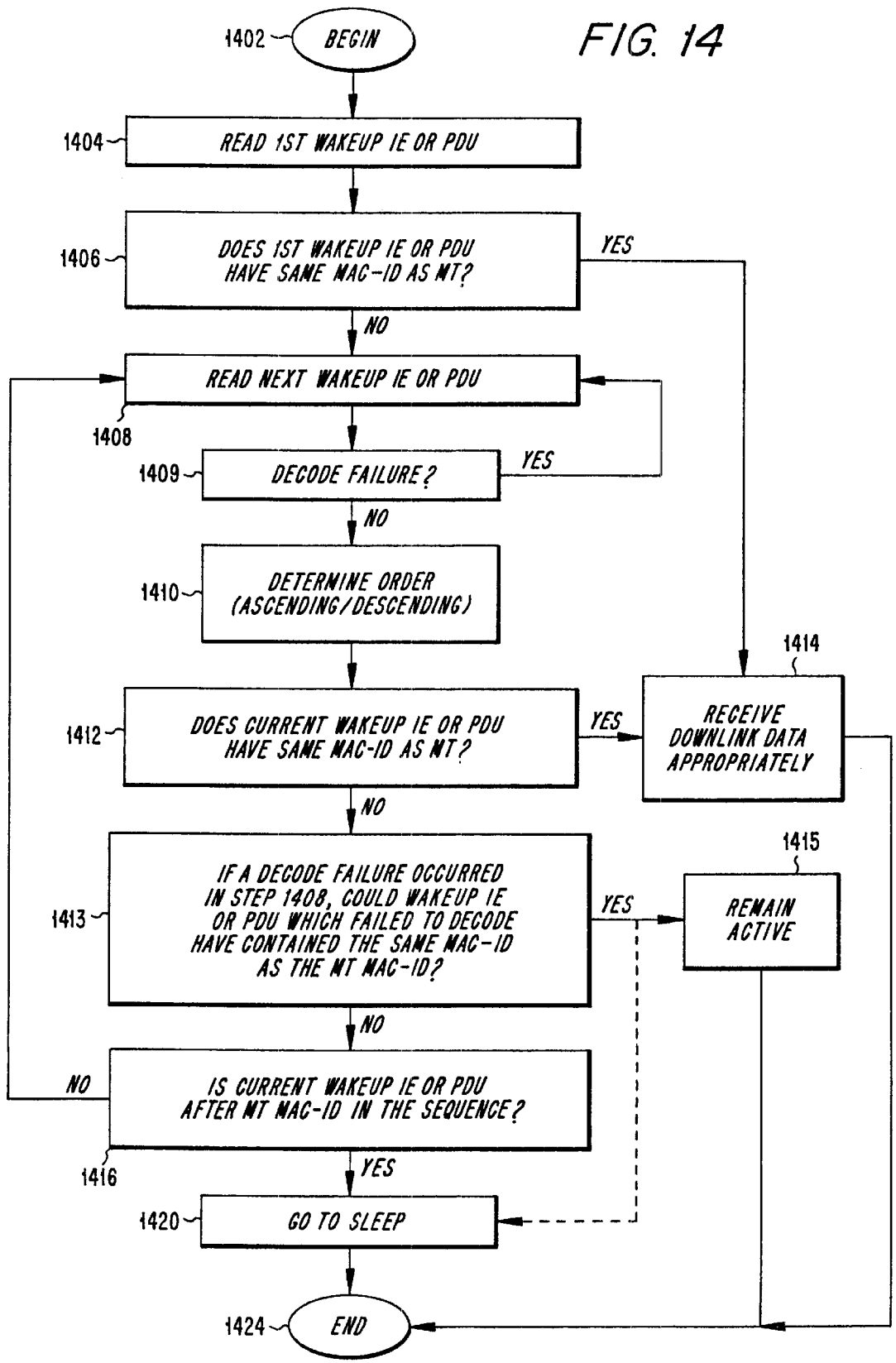
FIG. 14 shows a flow chart of a process in accordance with an exemplary embodiment of the invention.

FIG. 14 generally illustrates the principles described above with respect to the sixth and seventh embodiments. As shown in FIG. 14, the process begins at step 1402, and then proceeds to step 1404, where a first wakeup IE in the FCCH or a first wakeup PDU in the SBCH is read. From step 1404 control proceeds to step 1406, where the MT determines whether the first wakeup IE or wakeup PDU has the same MAC-ID as the MT. If yes, then control proceeds from step 1406 to step 1414, where the MT appropriately receives downlink data.

If the wakeup information includes wakeup PDUs located in the SBCH, then prior to step 1404 the MT would have gone to sleep if possible after reading an SBCH-IE in the FCCH and then reawakened at the start of the SBCH, as described further above, before reading the first wakeup PDU. If the wakeup information includes wakeup IEs located in the FCCH, then the MT can sleep, where possible, between steps 1406 and 1414 or between steps 1412 and 1414, until the downlink channel in the MAC frame allocated to the MT arrives, in accordance with principles described further above. From step 1414, control proceeds to step 1424 where the process ends.

If in step 1406 the MT determines that the first wakeup IE in the FCCH or the first wakeup PDU in the SBCH does not have the same MAC-ID as the MT, then control proceeds from step 1406 to step 1408, where the MT reads, or in other words analyzes, the next wakeup IE in the FCCH or next wakeup PDU in the SBCH. From step 1408 control proceeds to step 1409, where the MT determines whether a decode failure has occurred while reading a wakeup IE in the FCCH or a wakeup PDU in the SBCH. If yes, then control returns from step 1409 to step 1408. If no, then control proceeds from step 1409 to step 1410, where the order of the wakeup IEs or PDUs is determined.

From step 1410 control proceeds to step 1412, where the MT checks to see whether the current or most recently read wakeup IE from the FCCH or wakeup PDU from the SBCH has the same MAC-ID as the MT. If yes, then control proceeds from step 1412 to step 1414. If no, then control proceeds from step 1412 to step 1413, where the MT determines, if a decode failure occurred during step 1408, whether the wakeup IE or wakeup PDU that the MT failed to decode could have contained the same MAC-ID as the MT's MAC-ID. If in step 1413 the MT determines that a wakeup IE or wakeup PDU that the MT failed to decode could have contained the same MAC-ID as the MT's MAC-ID, then control proceeds from step 1413 to step 1415, where the MT remains active, and from step 1415 to step 1424, where the process ends. Alternatively, when the MT determines in step 1413 that a wakeup IE or wakeup PDU that the MT failed to decode could have contained the same MAC-ID as the MT's MAC-ID, control can proceed from step 1413 to step 1420, where the MT goes to sleep. From step 1420, control proceeds to step 1424.

If in step 1413 the MT determines that a wakeup IE or wakeup PDU that the MT failed to decode could not have contained the same MAC-ID as the MT's MAC-ID, then control proceeds from step 1413 to step 1416, where the MT determines whether the MAC-ID of the current wakeup IE or PDU is after the MT MAC-ID in the sequence. If no, then control returns from step 1416 to step 1408. If yes, the control proceeds from step 1416 to step 1420.

In accordance with an eighth embodiment of the invention, the AP is aware of the particular MAC frame in which each MT's sleep duration or sleep timer expires. This enables the AP to avoid including wakeup IEs or PDUs in a MAC frame that are directed to MTs that are scheduled to sleep without waking through the MAC frame. In other words, the AP can include wakeup IEs or PDUs only for MTs that it knows will be awake, or will awaken, to monitor the MAC frame. This feature can be especially useful where MTs are not capable of going to sleep early when wakeup IEs or PDUs are organized by MAC-ID, or where wakeup IEs or PDUs are not organized by MAC-ID. Thus, the principles outlined in the eighth embodiment and in FIG. 15 can be applied in a first situation where wakeup information includes wakeup IEs located in the FCCH, and in a second situation where wakeup information includes wakeup PDUs located in the SBCH.

Figure 15:
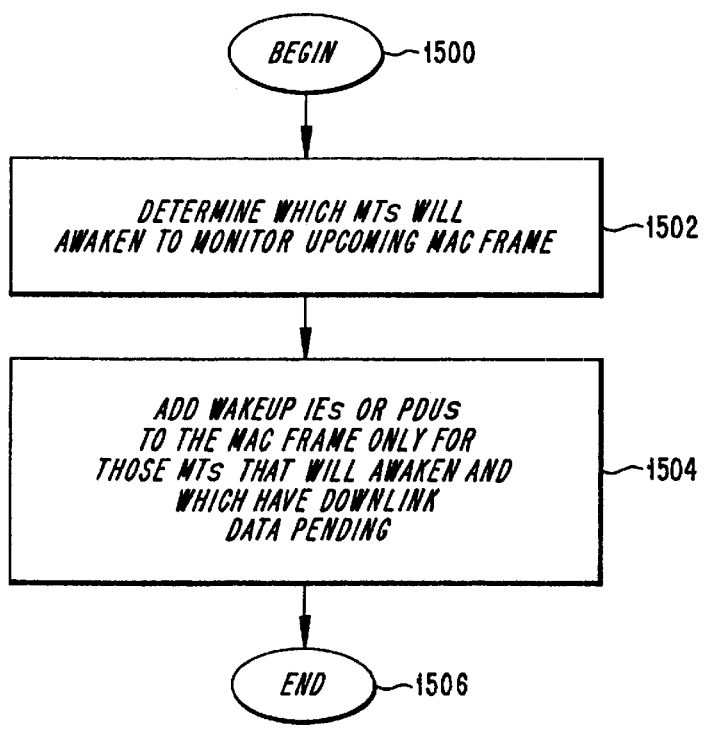
FIG. 15 shows a flow chart of a process in accordance with an exemplary embodiment of the invention.

FIG. 15 generally illustrates the principles described above with respect to the eighth embodiment. As shown in FIG. 15, the process begins at step 1502, while the AP is preparing data to enclose with an upcoming MAC frame. In step 1504, the AP determines which MTs will awaken to monitor the upcoming MAC frame, and then in step 1504 the AP prepares only those wakeup IEs or PDUs for the upcoming MAC frame, which correspond to MTs that will awaken to monitor the upcoming MAC frame, and which have downlink data pending. From step 1504 the process proceeds to step 1506 and ends.

Figure 9:
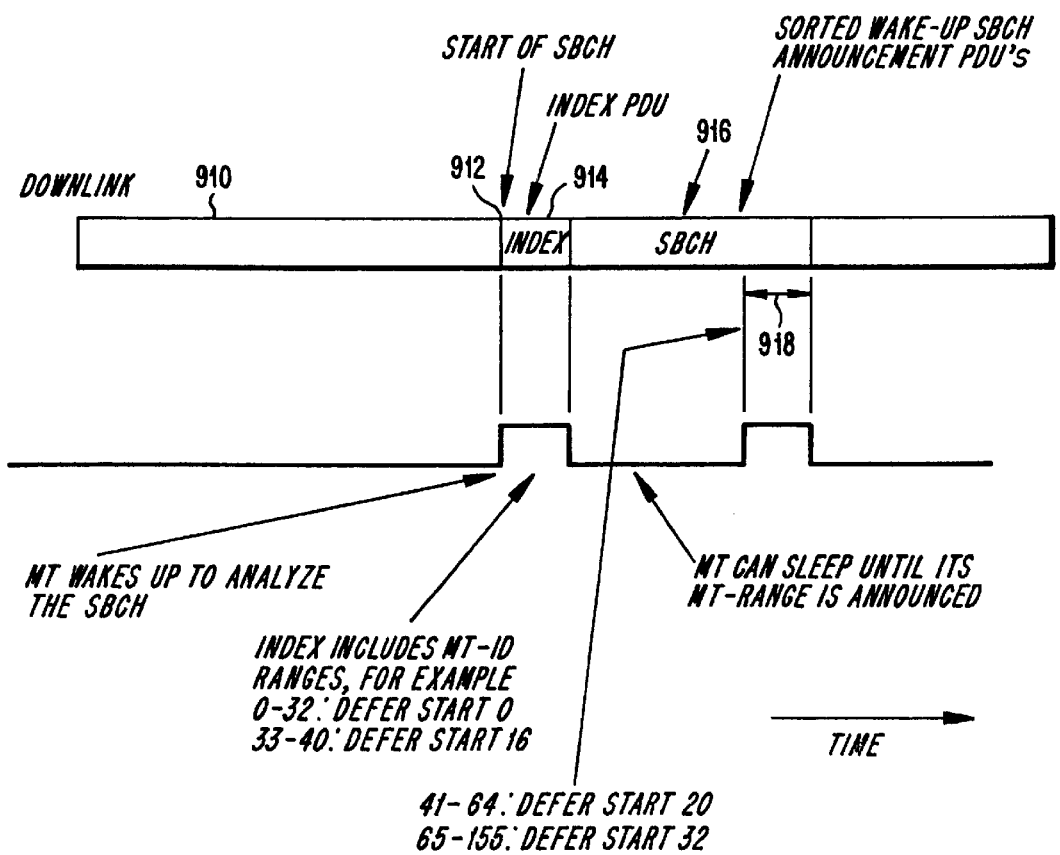
FIG. 9 shows an exemplary portion of a MAC frame in accordance with an exemplary embodiment of the invention.

In accordance with a ninth embodiment of the invention shown, for example, in FIG. 9, where wakeup PDUs are located in the SBCH, an index can be provided in the SBCH prior to the wakeup PDUs. The index indicates where in the list of wakeup PDUs a wakeup PDU bearing an MT's particular MAC-ID might occur. For example, the index can indicate different ranges of MAC-IDs, so that an MT can go to sleep after analyzing the index and then awaken to receive the portion of the SBCH containing a possible range of wakeup PDU MAC-IDs that includes the MT's MAC-ID. As shown in FIG. 9, at a beginning 912 of an SBCH 916 in a DLCHAN 910, an index 914 is provided that indicates where in the SBCH 916 wakeup IEs or PDUs having MAC-IDs within a certain range can be found. For example, wakeup IEs or PDUs having MAC-IDs between 0 and 32 are located immediately following the index 912, whereas wakeup IEs or PDUs having MAC-IDs between 64 and 255 are located beginning at an offset of 32 time units, or 32 bytes of information from the end of the index 912. The offset values can vary depending on the number of wakeup IEs or PDUs within the range that are actually present. For example, in a situation where the ranges each encompass the same number of MAC-IDs, the wakeup IEs or PDUs represented in each range in the SBCH 916 can vary. Of course, the ranges can also be chosen to vary.

Figure 16:
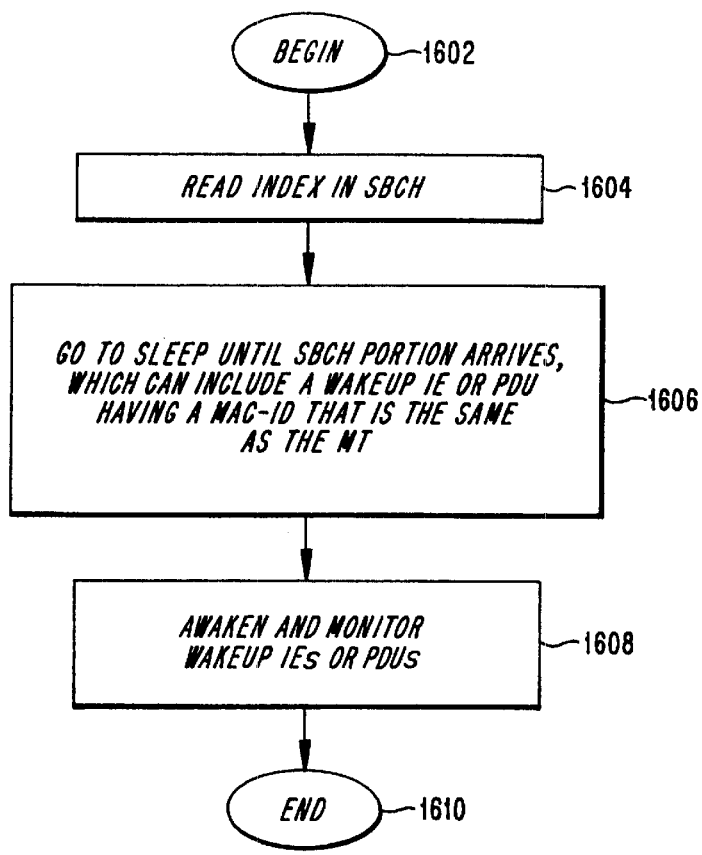
FIG. 16 shows a flow chart of a process in accordance with an exemplary embodiment of the invention.

FIG. 16 generally illustrates the principles described above with respect to the ninth embodiment. As shown in FIG. 16, the process begins at step 1602, where the MT reads and analyzes an index located at the beginning of the SBCH. From step 1602 control proceeds to step 1604, where the MT goes to sleep until the portion of the SBCH that can contain a wakeup IE or PDU having the same MAC-ID as the MT. From step 1604 control proceeds to step 1606 where the MT wakes up at the beginning of the appropriate portion of the SBCH, using information from the index, and monitors wakeup IEs or PDUs in accordance with principles previously described, to determine whether one or more of them has the same MAC-ID as the MT, and to proceed appropriately. From step 1606 control proceeds to step 1610, where the process ends.

Figure 17:
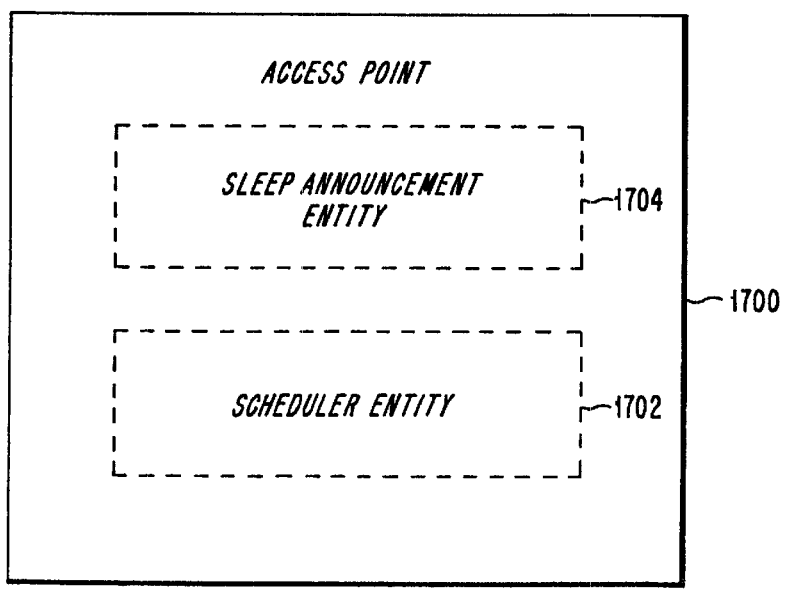
FIG. 17 shows internal details of an exemplary AP in accordance with exemplary embodiments of the invention.

FIG. 17 shows internal details of an exemplary AP in accordance with exemplary embodiments of the invention. In particular, an AP 1700 can include a scheduler entity 1702 and a sleep announcement entity 1704.

In a tenth exemplary embodiment of the present invention, when an MT wakes up to monitor a MAC frame, if the MT finds an indication that data is pending, for example an indication in the BCCH of the MAC frame, then the MT will also monitor the next MAC frame for an indication that data is pending. The MT will do this regardless of whether the present MAC frame (which contains an indication that data is pending) includes a wakeup PDU or IE for the MT, or not. When there is no wakeup PDU or IE for the MT, then the MT can go back to sleep for the remainder of the current MAC frame, and then wake up to monitor the next MAC frame. Alternatively, the MT can remain awake until the next MAC frame arrives. If a MAC frame does contain a wakeup PDU or IE for the MT, then the MT performs as outlined in the various embodiments described above, but also stays awake, or goes to sleep and then re-awakens, to monitor the next MAC frame for an indication as to whether data is pending. The MT will repeat this cycle of monitoring each successive MAC frame until it encounters a MAC frame with an indication that no data is pending (or without an indication that data is pending). This allows for a scalable bandwidth for the wakeup announcement that improves an overall robustness of the system.

Figure 18:
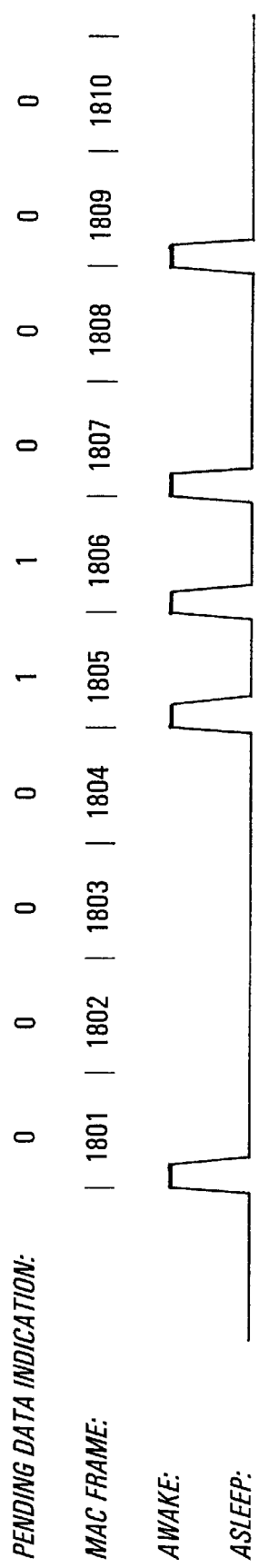
FIG. 18 a process in accordance with an exemplary embodiment of the invention, wherein a data pending indication causes the MT to monitor the next MAC frame also.

This can be seen, for example, in FIG. 18. FIG. 18 shows a series of MAC frames 1801–1810, beginning with a first MAC frame 1801. In this example, the MT has a normal sleep duration of 4 MAC frames, so that it will wakeup and monitor the BCCH of MAC frames 1801, 1805 and 1809 for the occurrence of a data pending indicator. As shown in FIG. 18, the pending data indication for MAC frames 1805 and 1806 is a binary 1, which means that the pending data indicator in the BCCH of the MAC frames 1805, 1806 has been set to indicate that data is pending. In the remaining MAC frames the pending data indication is a binary 0, which means that the pending data indicator in the BCCH of those MAC frames has been set to indicate that there is no data pending.

As shown in FIG. 18, the MT wakes up to monitor MAC frame 1801, and when it realizes that no data is pending, it goes back to sleep for its normal sleep duration of 4 MAC frames. When the MT wakes up to monitor the MAC frame 1805, it encounters an indication in the BCCH that data is pending. However, it does not find a wakeup PDU intended for it, and so it goes back to sleep. Since the MAC frame 1805 included an indication that data was pending, the MT wakes up to monitor the next MAC frame, 1806. This frame 1806 also has an indication that data is pending but does not have a wakeup PDU for the MT, so the MT goes back to sleep and then wakes up to monitor the very next MAC frame, 1807. The MAC frame 1807 has an indication that no data is pending, so the MT goes back to sleep, and remains asleep until its normal sleep duration expires and causes it to wakeup to monitor the MAC frame 1809. In this example, the normal sleep duration is counted to begin when the last normal sleep duration ended, thus preserving the timing of the normal sleep duration. This can ensure, for example, that when the MT is part of a sleep group that wakes up at specified intervals, that the MT will continue to wake up with the sleep group. The AP, of course, can change the MTs normal sleep duration, re-assign the MT to another sleep group, and so forth.

Figure 19:
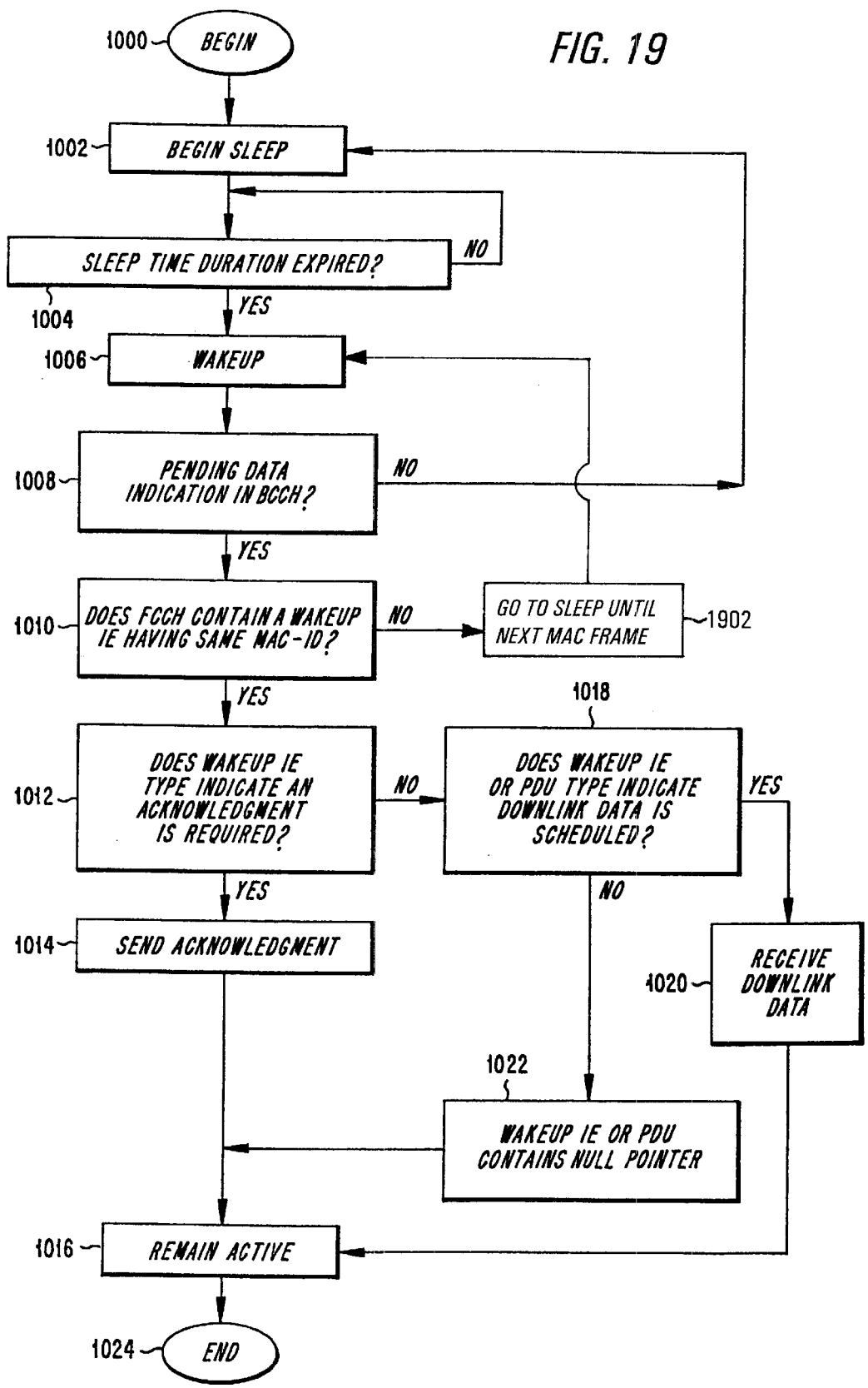
FIG. 19 is an exemplary flow chart of the process shown in FIG. 18.

FIG. 19 shows a flow chart that helps illustrate this procedure. The process shown in FIG. 19 is similar to that shown in FIG. 10, but differs in step 1010. In step 1010, if the FCCH does not contain a wakeup IE (or PDU) having the same MAC-ID as the MT, then control proceeds to step 1902, where the MT goes to sleep until the next MAC frame. From step 1902 control flows to step 1006, where the MT wakes up to monitor the next MAC frame. Alternatively, the MT can simply remain awake to monitor the next MAC frame, so that upon a negative determination at step 1010, control flows directly to step 1008 where the BCCH of the next (now present) MAC frame is examined.

Those of ordinary skill in the art will understand that this technique of always monitoring a next MAC frame when the present MAC frame contains an indication that data is pending, can be appropriately applied to the other embodiments described above. For example, in FIG. 14, after step 1414 and after step 1420, and in FIG. 12 after steps 1212 and 1214, the MT can awaken (or remain awake if it did not go back to sleep) to monitor the next MAC frame for an indication that data is pending. The same would also apply after steps 1312 and 1314 of FIG. 13, for example.

In summary, the various embodiments provide a multitude of advantages. For example, by using the FCCH instead of the SBCH to convey wakeup announcements such as wakeup IEs or PDUs, the procedure for waking MTs is simplified and excess power consumption by the MTs is further reduced. In addition, by using the FCCH to convey wakeup IEs or PDUs that have the same format as IEs or PDUs intended for MTs that are already awake or active, the AP can use the same scheduling procedures for both sleeping and active MTs thus making the system simpler and more robust.

By using the FCCH to convey wakeup announcements to MTs, the AP can organize MTs into small sleep or phase groups without requiring extra bandwidth, in contrast to the case where wakeup announcements are located in the SBCH. Furthermore, using the FCCH to convey wakeup announcements to MTs, where the wakeup announcements require the MTs to send an acknowledge signal to the AP, increases an amount of time that the MTs have in which to prepare and send the acknowledge signal.

By using some or all of an MT's MAC-ID to break MTs into phase or sleep groupings, the AP can minimize an amount of its internal resources that are necessary to support the sleep grouping functions, and an average MT power consumption can also be further reduced. By variously a) locating an SBCH-IE early in the FCCH and ordering wakeup IEs in the FCCH right after the SBCH-IE, b) sorting wakeup IEs or wakeup PDUs (in either the FCCH or the SBCH, respectively) by MAC-ID, MT power consumption can be further minimized and MT procedures for handling decode failures can be made more efficient. Adding an index to the SBCH and making the AP aware of when specific MTs will awaken to monitor the BCCH, the FCCH (and where appropriate, the SBCH) can also result in additional power conservation at the MTs.

Those skilled in the art will appreciate that the features described above can be variously combined.

U.S. Pat. No. 6,363,267, entitled "Mobile Terminal Decode Failure Procedure in a Wireless Local Area Network", is hereby incorporated by reference.

Those skilled in the art will recognize that the features and embodiments described in the copending and commonly owned application referenced above can be advantageously combined with the features and embodiments described in the present application. Ericsson documents no. ERVS-99013, ERVS-99021 and ERVS-99022 are hereby incorporated by reference, and are also filed herewith as Appendices A, B, and C, respectively.

An approved portion of a proposed ETSI HIPERLAN Type 2 standard is incorporated herein by reference, and is also filed herewith as Appendix D.

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. A method for minimizing power consumption in a mobile terminal in a wireless local area network including an access point, comprising the steps of:

locating wakeup information in a Frame Control Channel (FCCH) of a Medium Access Control (MAC) frame sent by an access point in the network, wherein the wakeup information includes information located at the beginning of the FCCH, the information located at the beginning of the FCCH including an indication of a location of a Slow Broadcast Channel (SBCH) in the MAC frame;

in the mobile terminal, monitoring the FCCH to determine whether the FCCH includes wakeup information having a MAC identification (MAC-ID) that is the same as a MAC-ID of the mobile terminal; and in the mobile terminal, when the FCCH does not include wakeup information having a MAC identification (MAC-ID) corresponding to the mobile terminal, going to sleep upon conclusion of the monitoring step.

2. The method of claim 1, further comprising the steps of:

determining whether wakeup information in the FCCH is ordered according to MAC-ID;

when the wakeup information in the FCCH is ordered according to MAC-ID, monitoring the wakeup information in the FCCH until either the wakeup information includes a MAC-ID corresponding to the mobile terminal, or until the mobile terminal determines that wakeup information remaining in the FCCH cannot include a MAC-ID corresponding to the mobile terminal, based on the value of the MAC-ID of the mobile terminal and the order of the wakeup information in the FCCH.

3. The method of claim 2, in the event of a decode failure while the mobile terminal is monitoring the wakeup information, further comprising the steps of:

determining whether the MAC-ID of the mobile terminal is excluded from wakeup information remaining in the FCCH based on the value of the MAC-ID and the order of the wakeup information in the FCCH; and when the MAC-ID of the mobile terminal is excluded from the wakeup information remaining in the FCCH, preventing the mobile terminal from sleeping.

4. The method of claim 1, further comprising the step of: determining whether the Broadcast Control Channel (BCCH) includes an indication of pending data.

5. The method of claim 4, further comprising the step of: when the BCCH includes a positive indication of pending data, repeating the step of determining for each successive MAC frame, until the BCCH does not include a positive indication of pending data.

6. The method of claim 4, further comprising the steps of: when the BCCH is determined to include an indication of pending data, proceeding with the step of locating wakeup information in the FCCH;

when the BCCH is determined to not include an indication of pending data, putting the mobile terminal to sleep.

7. The method of claim 1, wherein the wakeup information in the FCCH includes a MAC-ID and indicates which downlink channel in the MAC frame will contain downlink data for the mobile terminal identified by the MAC-ID.

8. The method of claim 1, wherein the wakeup information in the FCCH instructs the mobile terminal to send a predetermined acknowledge signal back to the access point.

9. The method of claim 8, wherein the wakeup information in the FCCH identifies an allocated uplink channel within the MAC frame via which the mobile terminal is to send the predetermined acknowledge signal.

10. The method of claim 8, wherein the wakeup information in the FCCH instructs the mobile terminal to send the predetermined acknowledge signal via a Random Access Channel (RACH) in the MAC frame.

11. The method of claim 8, wherein the wakeup information in the FCCH instructs the mobile terminal to send the predetermined acknowledge signal via a Random Access Channel (RACH) in a subsequent MAC frame.

12. The method of claim 11, wherein the wakeup information in the FCCH instructs the mobile terminal to send the predetermined acknowledge signal when the RACH first becomes available.

13. The method of claim 1, wherein the wakeup information in the FCCH indicates to the mobile terminal that the MAC frame does not contain downlink data for the mobile terminal, and instructs the mobile terminal to remain awake and decode each FCCH and Broadcast Control Channel (BCCH) that come along, until further notice.

14. The method of claim 1, wherein the local area network includes a plurality of mobile terminals, further comprising the step of:

dividing the mobile terminals into sleep groups based on MAC-IDs of the mobile terminals.

15. The method of claim 14, wherein each of the mobile terminals is assigned to one of two sleep groups based on a least significant bit of the MAC-ID of the mobile terminal.

16. The method of claim 14, further comprising the steps of:

the access point determining which sleep group of mobile terminals will awaken to monitor the FCCH, and the access point including wakeup information only for those mobile terminals that will awaken to monitor the FCCH.

17. The method of claim 1, further comprising the steps of:

accessing an index at a beginning of the SBCH, indicating locations of wakeup information in the SBCH, to determine when the mobile terminal should awaken to receive wakeup information in the SBCH corresponding to the mobile terminal; and the mobile terminal sleeping between the index and the wakeup information in the SBCH corresponding to the mobile terminal.

18. The method of claim 17, wherein the index indicates portions of the SBCH that correspond to different ranges of MAC-IDs.

19. The method of claim 1, further comprising the steps of:

during the step of monitoring the FCCH and after evaluating the information at the beginning of the FCCH to determine the location of the SBCH, determining that the FCCH does not include wakeup information having a MAC-ID corresponding to the mobile terminal; and the mobile terminal awakening at the location of the SBCH.

20. The method of claim 19, further comprising the step of:

when wakeup information in the SBCH is ordered, monitoring the wakeup information beginning at the location of the SBCH at which the mobile terminal awakens, until either the wakeup information includes a MAC-ID corresponding to the MAC-ID of the mobile terminal, or until the mobile terminal determines that wakeup information remaining in the SBCH cannot include a MAC-ID corresponding to the mobile terminal, based on the value of the MAC-ID and the order of the wakeup information in the SBCH.

21. The method of claim 1, wherein:

the wakeup information further includes at least one Wakeup Information Element (IE) located right after the information at the beginning of the FCCH, each at least one Wakeup IE including a MAC-ID; and in the mobile terminal, when during the step of monitoring it is determined that the at least one Wakeup IE does not contain a MAC-ID corresponding to the mobile terminal, determining that the FCCH does not include wakeup information having a MAC-ID corresponding to the mobile terminal.

22. The method of claim 1, wherein the indication of the location of the SBCH is located at the beginning of the FCCH.

* * * * *